(12) United States Patent
Kulkarni (10) Patent No.: US 11,777,910 B2
(45) Date of Patent: Oct. 3, 2023

(54) SYSTEMS AND METHODS PROVIDING MESSAGE ENCRYPTION ON A CAN BUS USING REMOTE FRAMES

(71) Applicants: HYUNDAI MOTOR COMPANY, Seoul (KR); KIA MOTORS CORPORATION, Seoul (KR)

(72) Inventor: Ashwin Kulkarni, Superior Township, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 429 days.

(21) Appl. No.: 16/903,603

(22) Filed: Jun. 17, 2020

(65) Prior Publication Data
US 2021/0400024 A1    Dec. 23, 2021

(51) Int. Cl.
*H04L 29/06* (2006.01)
*H04L 9/40* (2022.01)
*G06F 16/22* (2019.01)
*H04L 12/40* (2006.01)

(52) U.S. Cl.
CPC ......... *H04L 63/0428* (2013.01); *G06F 16/22* (2019.01); *H04L 12/40013* (2013.01)

(58) Field of Classification Search
None
See application file for complete search history.

(56) References Cited

U.S. PATENT DOCUMENTS

| | | | | |
|---|---|---|---|---|
| 10,606,709 | B1 * | 3/2020 | Bansal | G06F 11/1464 |
| 2002/0023077 | A1 * | 2/2002 | Nguyen | G06F 16/951 |
| 2005/0254518 | A1 * | 11/2005 | Fujimori | H04L 69/08 |
| | | | | 370/466 |
| 2015/0124597 | A1 * | 5/2015 | Mabuchi | H04L 67/62 |
| | | | | 370/230 |
| 2016/0112215 | A1 * | 4/2016 | Lee | H04L 12/46 |
| | | | | 370/235 |
| 2021/0306177 | A1 * | 9/2021 | Fredriksson | H04L 41/0816 |

FOREIGN PATENT DOCUMENTS

KR    10-1549034 B1    9/2015

OTHER PUBLICATIONS

Hoppe, et al. Security threats to Automotive CAN networks—Practical examples and selected short-term countermeasures, Reliability Engineering and System Safety, vol. 96, (2011) pp. 11-25.

* cited by examiner

*Primary Examiner* — Alex Skripnikov
*Assistant Examiner* — Pamit Kaur
(74) *Attorney, Agent, or Firm* — LEMPIA SUMMERFIELD KATZ LLC

(57) ABSTRACT

Systems and methods are disclosed for implementing enhanced security measures for working against unwanted intrusion from outside attackers into a vehicle's controller area network (CAN) bus. The enhanced security measures utilize existing data frames that are transmitted within the CAN bus to encrypt message identifications (IDs) for certain messages that are related to important features of a vehicle.

15 Claims, 7 Drawing Sheets

| Data Field used for Feature | Original Identifier (ID for Message) |
|---|---|
| Speed | 100 |
| Airbag Deployment Message | 101 |
| Brake Paddle Status | 102 |

SYSTEMS AND METHODS PROVIDING MESSAGE ENCRYPTION ON A CAN BUS USING REMOTE FRAMES

FIELD

Enhanced security measures are disclosed for working against unwanted intrusion from outside attackers into a controller area network (CAN) bus. The enhanced security measures utilize existing data frames that are transmitted within the CAN bus to encrypt message identifications (IDs) for certain messages that are related to important features of a vehicle.

BACKGROUND

The statements in this section merely provide background information related to the present disclosure and may not constitute prior art.

With the advancement in technologies that are being applied to vehicles, vehicles have become more reliant on communicating important data within its CAN bus. The data communicated within the CAN bus may be used for controlling vehicle features such as braking, cruise control, and airbag deployment. Without implementing security measures on the CAN bus, a vehicle may be prone to an outside intruder gaining access to the CAN bus and conducting an in-the-middle attack which intercepts data on the CAN bus and replaces it with compromised data to interfere with the vehicle's operations.

SUMMARY

The present disclosure provides a computing device to improve security and protect the CAN bus system from unwanted intrusions. In one form of the present disclosure, the computing device includes: a data reception circuitry configured to receive a digital message communicated via a controller area network (CAN) bus; a data storage unit configured to store a plurality of databases, wherein each of the plurality of databases stores a respective data table including a mapping of an original message identifier (ID) to a secret message identifier (ID); a processing circuitry configured to: read the digital message to detect a message ID; read the digital message to detect a database ID; retrieve a secret message ID mapping table stored on a database corresponding to the database ID; and transmit a return message on the CAN bus. In particular, the return message may replace the message ID with the secret message ID.

In another form, the database ID is included in a DLC field of the digital message, and the message ID is included in an identifier field of the digital message. The database ID may be a four-bit binary number. The plurality of databases may include sixteen databases.

In other form, the digital message is a remote data frame, and the data reception circuitry is configured to receive the remote data frame periodically.

In some implementations of the present disclosure, a method for improving security in electronic communications includes: receiving, by a data reception circuitry, a digital message communicated via a controller area network (CAN) bus; storing, in a data storage unit, a plurality of databases, wherein each of the plurality of databases stores a respective data table including a mapping of an original message identifier (ID) to a secret message identifier (ID); reading, by a processing circuitry, the digital message to detect a message ID; reading, by the processing circuitry, the digital message to detect a database ID; retrieving, by the processing circuitry, a secret message ID mapping table stored on a database corresponding to the database ID; and transmitting, by the processing circuitry, a return message on the CAN bus. In one form, the return message may replace the message ID with the secret message ID.

In some implementations, the database ID is included in a DLC field of the digital message, and the message ID is included in an identifier field of the digital message. In another form, the database ID is a four-bit binary number, and the plurality of databases comprises sixteen databases. The digital message is a remote data frame, and the data reception circuitry is configured to receive the remote data frame periodically.

In another aspect of the present disclosure, a computing device has a processing circuitry that stores a message ID in an identifier field of a digital message and stores a database ID in a data field of the digital message; and a data transmission circuitry configured to transmit the digital message on a controller area network (CAN) bus. In particular, the database ID identifies a database including a secret ID mapping table stored on the computing device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The forms described herein relate to enhanced security measures applied to a controller area network (CAN) bus installed on a vehicle. While the CAN bus described herein is provided in the context of being installed on a vehicle, the security features described as being applied to the CAN bus may be applied to CAN buses that are installed on other device according to other forms, and are not necessarily limited to the vehicle forms.

Figure 1:
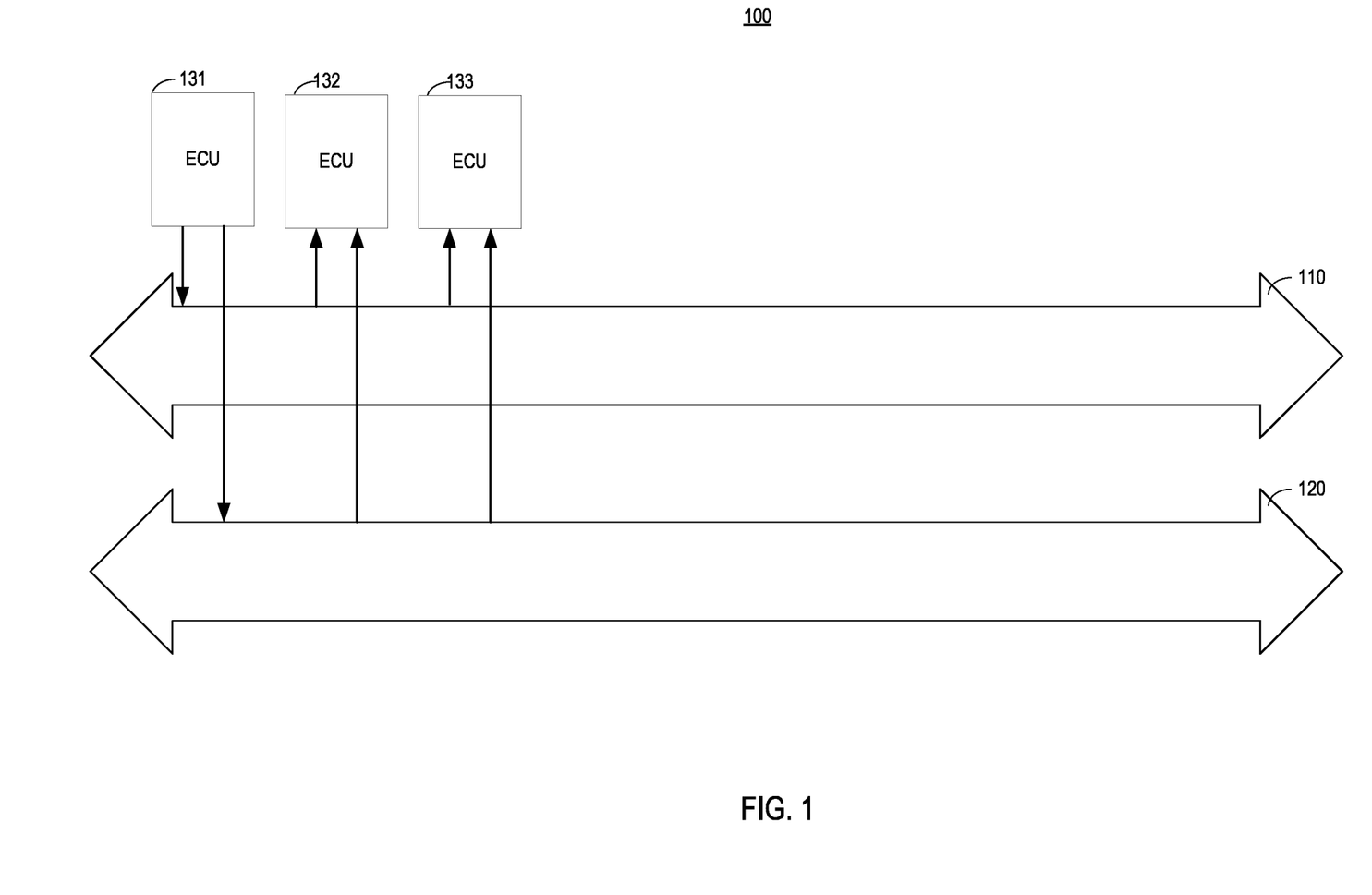
FIG. 1 shows an exemplary CAN bus system, according to some forms.

A vehicle's CAN bus is used to communicate data to and from different engine control units (ECUs) that are coupled to the CAN bus, where the ECUs are utilized for controlling specific vehicle features. As one form of the present disclosure, FIG. 1 illustrates an exemplary vehicle's CAN bus system 100 that includes a first CAN bus 110, a second CAN bus 120, a first ECU 131, a second ECU 132, and a third ECU 133. Although the first CAN bus 110 and the second CAN bus 120 are shown and intended to be separate bus lines in FIG. 1, according to some forms they may be representative of a single common bus line. An ECU on the CAN bus system 100 may be referred to as a node of the CAN bus system 100. More specifically, each ECU 131-132 shown in FIG. 1 is configured to control a dedicated vehicle feature such as vehicle speed control, airbag deployment control, cruise control, brake control, anti-theft systems control, traction control, and/or engine control. For exemplary purposes, the ECUs 131-132 may represent ECUs that control high value vehicle functions. For example, the first ECU 131 may be configured for vehicle speed control, the second ECU 132 may be configured for air bag deployment control, and the third ECU 133 may be configured for brake controls. One or more of the ECUs 131-133 may be programmable to modify its functionality based on information received through the first CAN bus 110 or second CAN bus 120.

As shown in FIG. 1, information is communicated between the ECUs 131-133 on the first CAN bus 110 and the second CAN bus 120. When the first ECU 131 transmits a message on the first CAN bus 110 or the second CAN bus 120, the remaining ECUs (e.g., the second ECU 132 and the third ECU 133) coupled to the first CAN bus 110 or the second CAN bus 120 will receive the message. According to exemplary forms, when a single ECU (e.g., the first ECU 131) transmits a message on the first CAN bus 110 or the second CAN bus 120, the message is sent to all of the remaining ECUs (e.g., the second ECU 132 and the third ECU 133) and all of the remaining ECUs (e.g., the second ECU 132 and the third ECU 133) will receive the message. Further description of the message ID is provided with reference to the CAN bus system 100 illustrated in FIG. 2.

Figure 2:
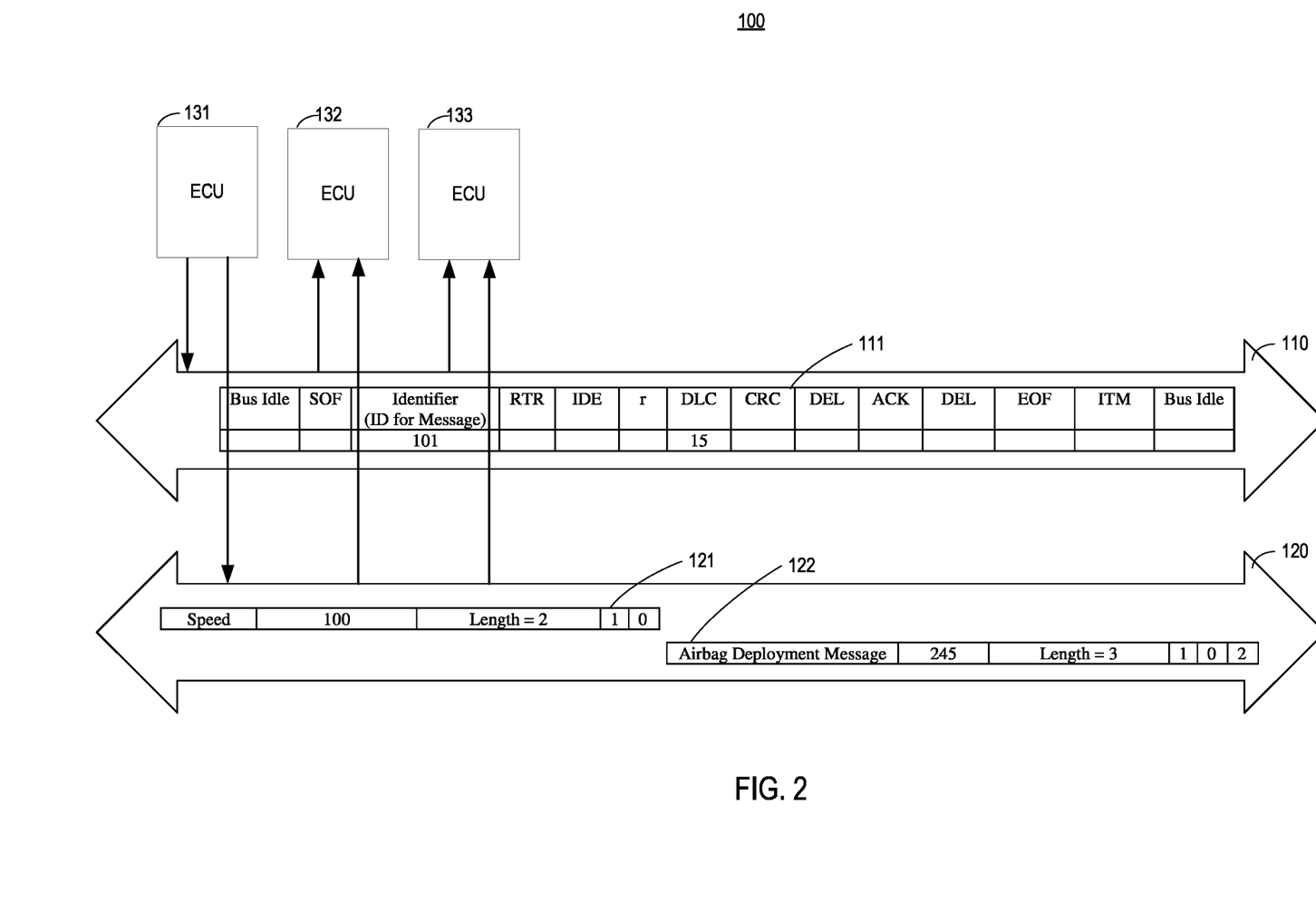
FIG. 2 shows an exemplary CAN bus system, according to some forms.

In FIG. 2, the first ECU 131 is shown to transmit a remote frame 111 (hereinafter may be referred to as "RTR frame") of data in the first CAN bus 110. The second ECU 132 and the third ECU 133 both receive the RTR frame 111 through the first CAN bus 110. The RTR frame 111 is a known type of data frame that is transmitted through the first CAN bus 110 to communicate information between the ECUs 131-133. The RTR frame 111 includes multiple fields including an SOF field (start of frame bit), an Identifier field (ID for a message), an RTR field (remote transmit request bit), an IDE field (identifier extension bit), an 'r' field (reserved bit), a DLC field (data length code), a CRC field (cyclic redundancy code), a DEL field, an ACK field (acknowledgement), a DEL field (delimiter bit), an EOF field (end of frame bit), and an ITM field (intermission). The bus idle fields located at the beginning and end of the RTR frame 111 are included to represent the bounds of the RTR frame 111, where information is not transmitted within the bus idle frames.

In the described forms, the RTR frame 111 is utilized to transmit a two-part message that includes a message ID in the identifier field and a database identifier (ID) in the DLC field of the RTR frame 111. In the described forms, the RTR frame 111 is being utilized to transmit the two-part message because the RTR frame 111 is in many cases an underutilized data frame within the CAN bus system 100. However, other data frames may be used to transmit the two-part message within the CAN bus system 100.

Figure 3:
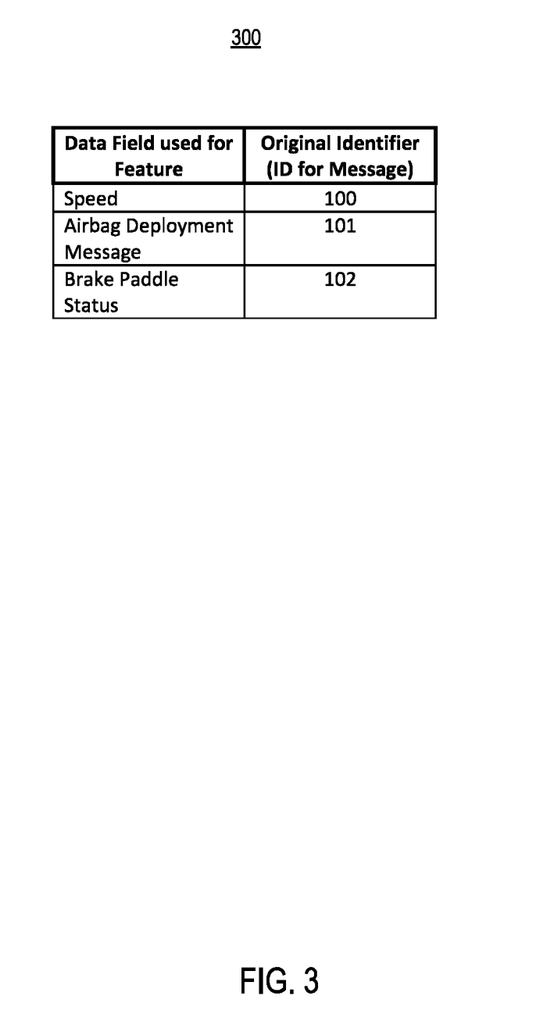
FIG. 3 shows an exemplary table of vehicle features and their corresponding message identifiers, according to some forms.

As a vehicle's technology improves and offers more high-tech features, the CAN bus system 100 is relied upon more often to communicate data amongst the different ECUs of the vehicle. With this increased reliance on utilizing the CAN bus system 100 to transmit data to the vehicle ECUs, there is a desire to improve security to protect the CAN bus system from unwanted intrusions. For example, an unwanted third party may attempt to launch a man-in-the-middle type cyber security attack that intercepts messages on a CAN bus and replaces it with a corrupted message that disrupts the vehicle operations. To help prevent such unwanted intrusions, a security solution is disclosed for mapping message IDs to secret identifiers that are unknown to entities outside the CAN bus system 100. For example, FIG. 3 shows a message ID table 300 that assigns a specific message ID to a specific vehicle feature. In the message ID table 300, the vehicle speed control feature is assigned a message ID of 100, the vehicle airbag deployment message feature is assigned a message ID of 101, and the vehicle brake paddle status feature is assigned a message ID of 102. Each ECU in the CAN bus system 100 is configured to control a specific vehicle function and is accordingly assigned their own unique message ID. So when a message is transmitted on the CAN bus system 100, the receiving ECUs will read the message ID value in the transmitted message to determine whether the message was intended for them. So in the case of the message ID having a value of 101 relating to the airbag deployment controls, this represents a message intended for the second ECU 132 configured to control the airbag deployment features of the vehicle. Each of assigned message IDs 100-102 described herein is used for exemplary purposes and may include any other message IDs representing other vehicle features.

According to the CAN bus system 100 illustrated in FIG. 2, the first ECU 131 transmits a message in the RTR frame 111 within the first CAN bus 110, where the message includes a message ID value of 101 in the identifier field. This message ID value of 101 represents that the message is intended for the second ECU 132 which is responsible for controlling the airbag deployment features. However, as the identifier field is a known field of a data frame transmitted in the first CAN bus 110, an outside intruder looking to disrupt the vehicle's airbag deployment features would know to view the identifier field of messages communicated on the CAN buses 110 and 120 to find messages having the message ID value of 101. By identifying messages with the message ID value of 101 in the identifier field, the outside intruder can disrupt messages intended for the second ECU 132 that is configured to control the airbag deployment. An exemplary attack may find an outside intruder intercepting messages on the first CAN bus 110 or second CAN bus 120 including a message ID of 101 in the identifier field, and then corrupting the message by altering the message ID in the identifier field. By doing so, the receiving ECUs will not be viewing the original intended message ID value, and the intended second ECU 132 will not confirm reception of the message as the message ID value of 101 will have been modified by the outside intruder. As the reception confirmation message is not transmitted back to the first ECU 131, the first ECU 131 will understand that its message was not properly received by the second ECU 132. This causes the first ECU 131 to transmit a subsequent message. As the outside intruder continues to intercept these messages and changing the message ID value in the identifier field, eventually a predetermined limit will be reached and the CAN bus system 100 determines there is an issue with the second ECU 132 that is causing it to fail receiving messages. When the CAN bus system 100 determines there is an issue with the second ECU 132, the CAN bus system 100 may disable the second ECU 132, thus turning off or limiting the vehicle's airbag deployment features. The above description of the first ECU 131 and the second ECU 132 is intended for exemplary and explanatory purposes only. In some forms of the present disclosure, any ECU of a plurality of ECUs may control other specific vehicle features (e.g., high value vehicle features) than vehicle speed control, airbag deployment control, brake control, and the message can be communicated on any CAN bus including the first CAN bus 110 and the second CAN bus 120.

Figure 6:
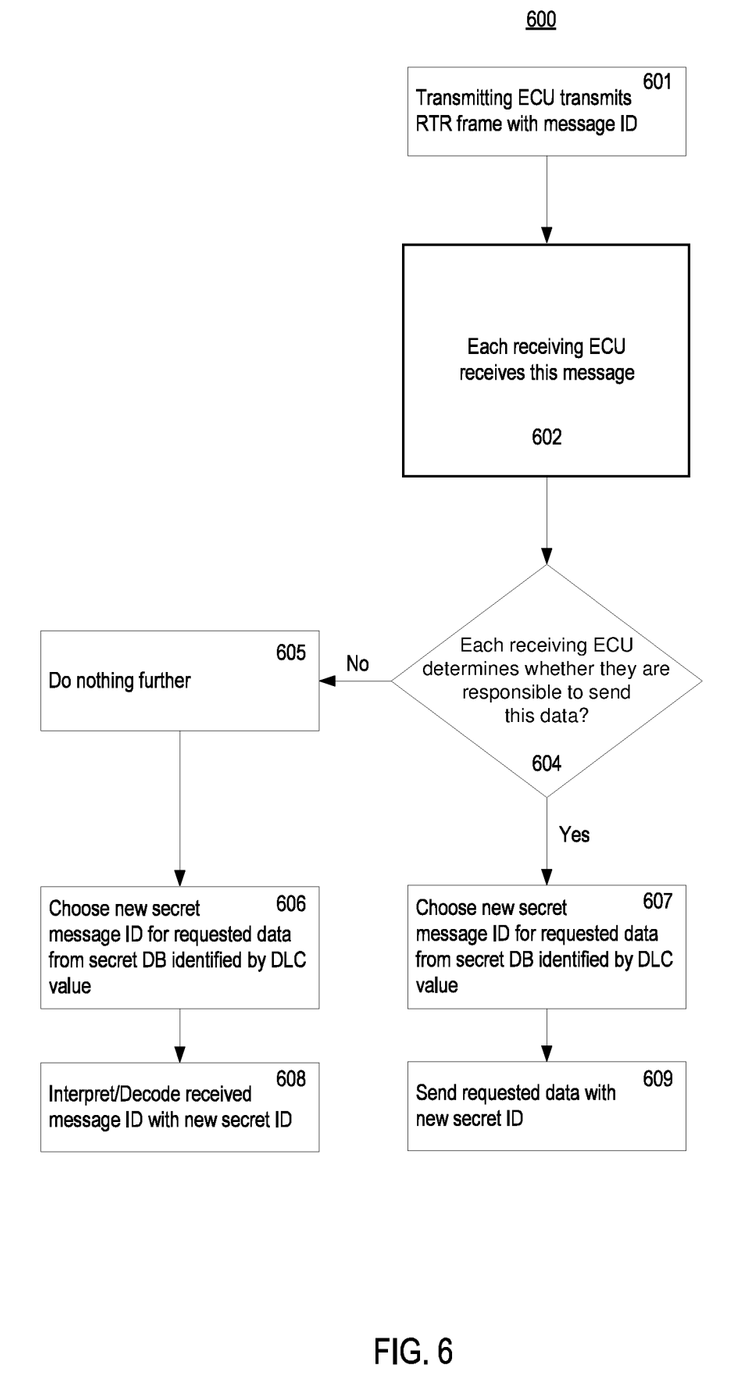
FIG. 6 shows an exemplary flow diagram describing a secret message identification strategy, according to some forms.

To prevent such an attack by an outside intruder, enhanced security measures are disclosed for "hiding" messages intended for ECUs that control one or more predetermined vehicle features (e.g., high value vehicle features). The enhanced security measures work by switching out the known message ID value of 101 for another secret message ID value. The message ID of 101 is used for exemplary purposes and other message IDs, including but not limited to, the message ID of 100 and the message ID of 102, may be used in the same or a similar manner for the enhanced security measures. FIG. 6 illustrates an exemplary flow diagram 600 describing a process for implementing these enhanced security measures on the CAN bus system 100.

Figure 4:
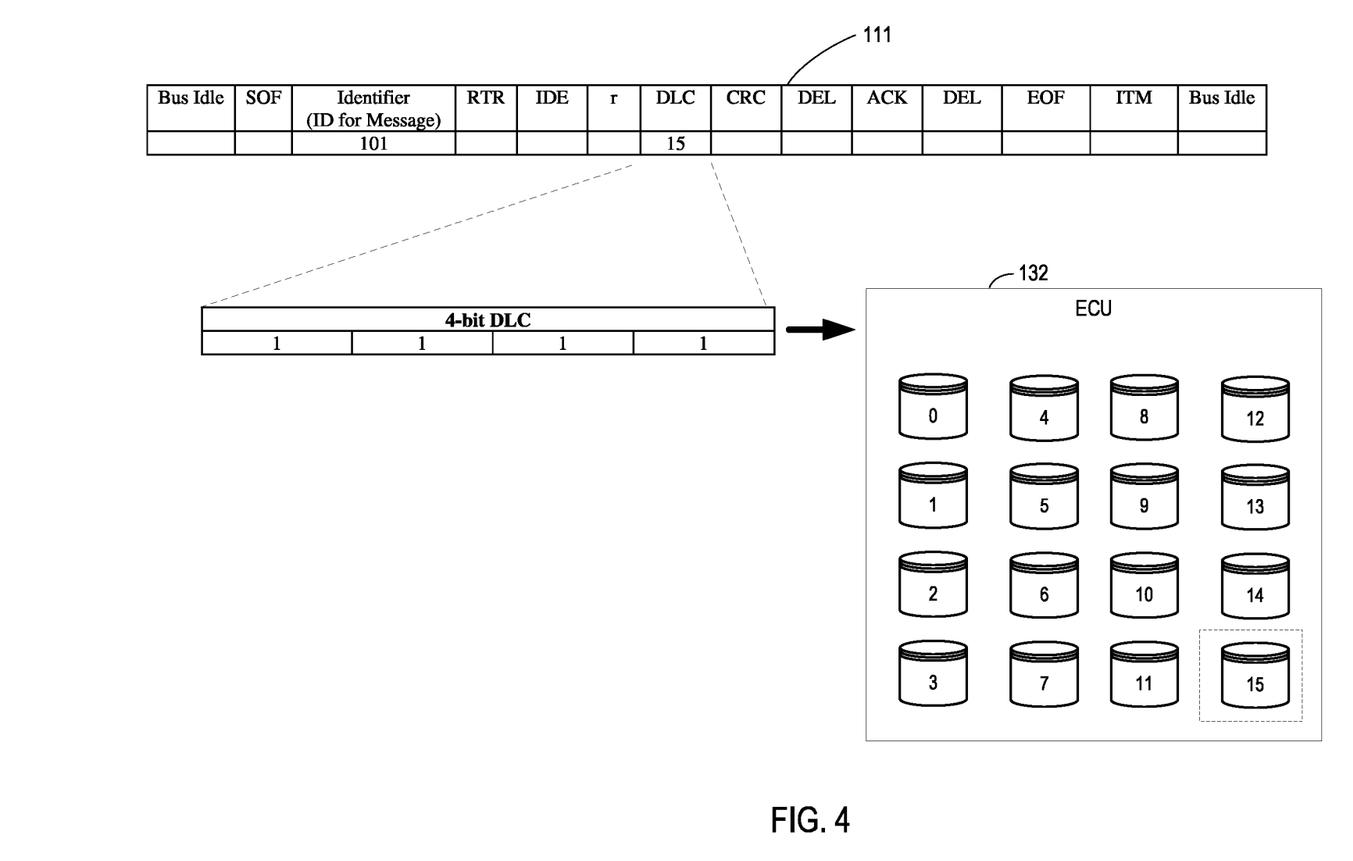
FIG. 4 shows an exemplary remote frame transmitted through a CAN bus, according to some forms.

At 601, the first ECU 131, for example, transmits a message in the RTR frame 111 with a message ID value of 101 in the identifier field as shown in FIG. 2. Similarly, any ECU of the plurality of ECUs, including but not limited to, the second ECU 132 and the third ECU 133, may transmit the message in the RTR frame 111 when the attack by an outside intrude is detected. In some forms of the present disclosure, any ECU of the plurality of ECUs may transmit the message in the RTR frame 111 when any ECU decides to send any message in a secret manner even if the attack is not detected. Also included in the RTR frame 111, the DLC field includes a value of 15. The DLC field holds a 4-bit value ranging from 0-15 for identifying a corresponding database included in ECUs 131-133. So the DLC field value of 15 (represented by the 4-bit value of 1-1-1-1) identifies a database 15 included in each of the ECUs 131-133. Each of the ECUs 131-133 included in the CAN bus system 100 are configured to store the same sixteen databases (e.g., database 0-15) that is identified by the value of the DLC field. For example, FIG. 4 shows how the second ECU 132 includes sixteen databases, and how the DLC field value of 15 is read by the receiving second ECU 132 to look at the corresponding database 15.

At 602, each of the ECUs 131-133 receives the message transmitted in the RTR frame 111.

At 604, each of the receiving ECUs 131-133 determines whether they are the intended recipient of the message in the RTR frame 111. In other words, each of the receiving ECUs 131-133 determines whether they are responsible to send this data. For example, at 605, when the third ECU 133, determines that it is not the intended recipient of the message in the RTR frame 111, the third ECU 133 does not send a confirmation response message back to the first ECU 131 that transmitted the message in the RTR frame 111. On the other hand, if the second ECU 132 determines that it is the intended recipient of the message in the RTR frame 111, the second ECU 132 transmits requested message data, which is the secret message ID and a corresponding actual value back to the CAN buses 110 and 120.

At both 606 and 607, the receiving second ECU 132 and the receiving third ECU 133 both identify the message ID value of 101 from the identifier field and the DLC field value of 15 from the RTR frame 111. With this information, the receiving second ECU 132 and the receiving third ECU 133 both confirm that a new secret message ID will be assigned for replacing the current message ID value 101 with a new secret ID for messages relating to airbag deployment features, and confirm the new secret ID will be found in the database 15 as identified by the DLC field value of 15.

For example, FIG. 4 shows how the second ECU 132 receives the RTR frame 111, and reads the message ID value of 101 in the identifier field to understand that the second ECU 132 is the intended recipient of the RTR frame 111 based on the second ECU 132 being responsible for controlling airbag deployment features in the vehicle. The second ECU 132 further reads the DLC field value of 15 to understand that a new secret message ID for airbag deployment related messages intended for the second ECU 132 will be found in the database 15.

Figure 5:
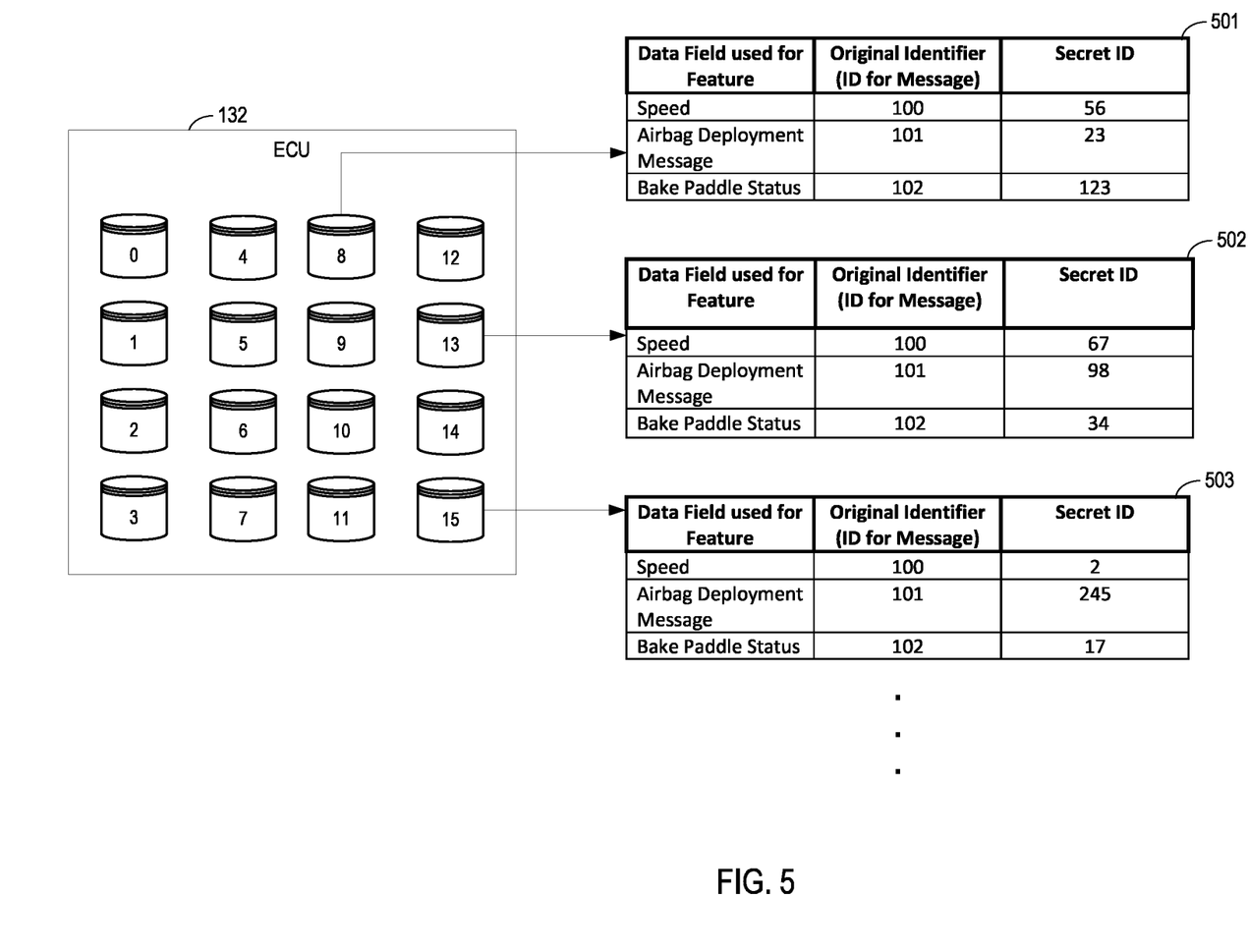
FIG. 5 shows an exemplary engine control unit that includes a plurality of databases storing tables of information, according to some forms.

FIG. 5 shows a number of exemplary ID mapping tables that may be stored in each of the databases 0-15 included in the second ECU 132. For example, a first ID mapping table 501 is stored in database 8, a second ID mapping table 502 is stored in database 13, and a third ID mapping table 503 is stored in database 15. As the DLC field in the RTR frame 111 identifies database 15, the new secret message ID for the airbag deployment related messages intended for the second ECU 132 will be found in the third ID mapping table 503 stored in the database 15. The third ID mapping table 503 sets the new secret message ID for airbag deployment messages to 245. So going forward, all the ECUs 131-133 receiving a data frame where the identifier field holds a message ID value of 245 will understand that it is an airbag deployment related message intended for the second ECU 132. An outside intruder does not have access to the ID mapping tables stored in the ECUs 131-133, and therefore will not understand that the new message ID value of 245 is being used to identify airbag deployment related messages. So if the outside intruder is still attempting to detect and corrupt data frames having the old message ID value of 101 for airbag deployment messages, the outside intruder will ignore and not intercept the new messages with the new secret message ID value of 245. This is how airbag deployment messages are able to be communicated on the CAN bus system successfully without fear of interference from outside intruders that do not know the new secret message ID assignment scheme. As shown in FIG. 2, other data frames such as the first data frame 121 relating to vehicle speed control features may continue to be transmitted using the original message ID value of 100 if they haven't yet been assigned a new secret ID value. However, data frames carrying messages about airbag deployment features such as the second data frame 122 will now be using the new secret ID value of 245 going forward.

So going forward after mapping the new secret message ID, at 609 in the flow diagram 600 each subsequent message for airbag deployment will be identified in data frames by the new secret ID value of 245. Similarly, at 608 in the flow diagram 600 the remaining ECUs will also understand that data frames with an identifier field value of 245 are intended for the second ECU 132 that is configured to handle airbag deployment features of the vehicle.

This secret ID mapping strategy described by flow diagram 600 may be re-implemented at predetermined cycles after a set amount of time has passed or a set number of messages with the new secret ID have been transmitted and/or received. By re-implementing the secret ID mapping strategy, a new RTR frame 111 may be transmitted to all the ECUs 131-133 that includes a new DLC field value. This new DLC field value will be read by the ECUs 131-133 to identify the database from which the new secret ID mapping will be taken from after the mapping from the third ID mapping table 503 stored in database 15 has expired.

Figure 7:
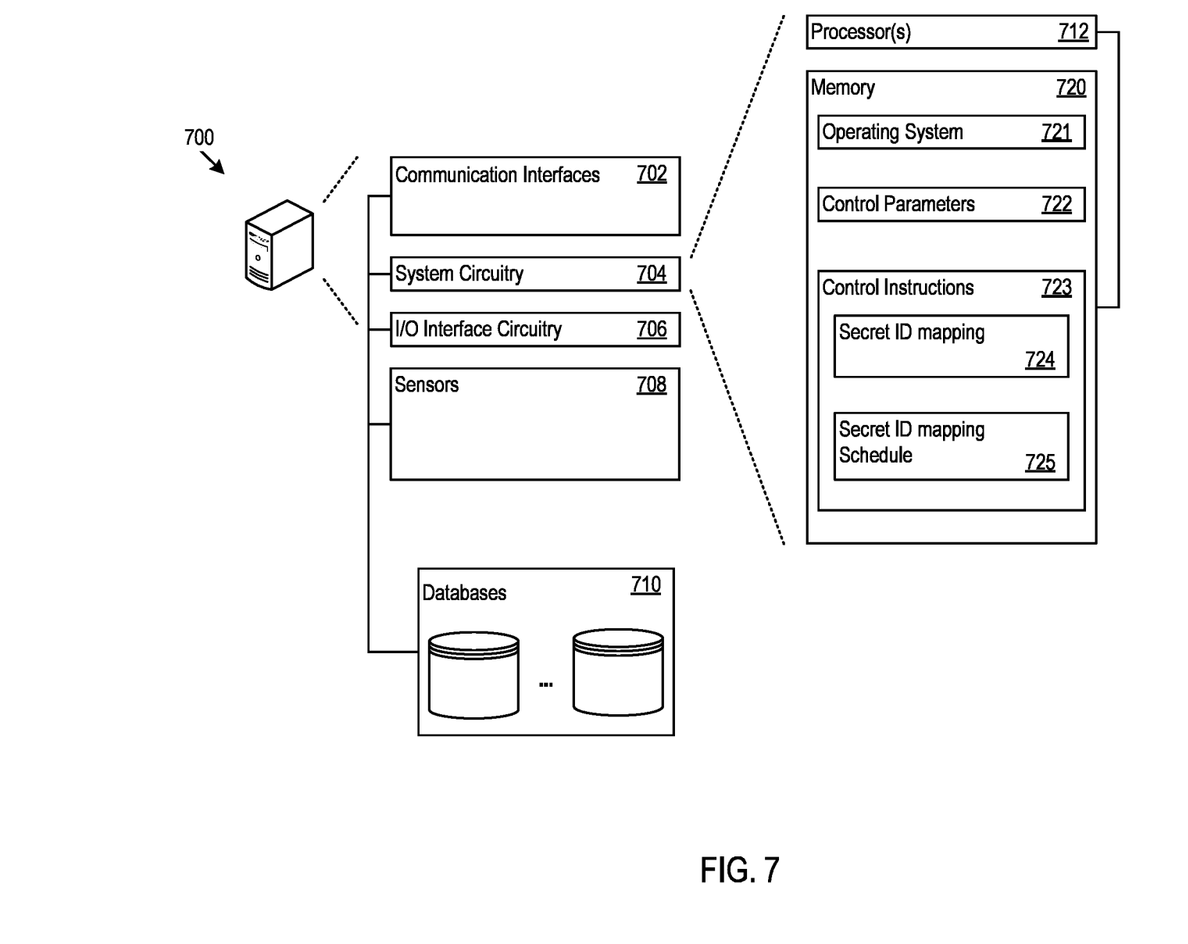
FIG. 7 shows an exemplary architecture for an engine control unit, according to some forms.

FIG. 7 illustrates an exemplary computer architecture of an ECU 700 that may be utilized for implementing the security measures described herein. The ECU 700 may, for example, be representative of the ECUs 131-133. The ECU 700 includes communication interfaces 702, system circuitry 704, input/output (I/O) interface circuitry 706, and sensors 708.

The I/O interface circuitry 706 may include touch sensitive displays, voice or facial recognition inputs, buttons, switches, speakers and other user interface elements for controlling access to the ECU 700. Additional examples of the I/O interface circuitry 706 includes microphones, video and still image cameras, headset and microphone input/output jacks, Universal Serial Bus (USB) connectors, memory card slots, and other types of inputs. The I/O interface circuitry 706 may further include magnetic or optical media interfaces (e.g., a CDROM or DVD drive), serial and parallel bus interfaces, and keyboard and mouse interfaces.

The communication interfaces 702 may be used for accessing a CAN bus to receive and/or transmit data between ECUs and/or other devices that are coupled to the CAN bus. For example, the communication interfaces 702 may include wireless and/or wired transmitters and receivers ("transceivers") and any antennas used by the transmit and receive circuitry of the transceivers. The transceivers and antennas may support WiFi network communications, for instance, under any version of IEEE 802.11, e.g., 802.11n or 802.11ac, or other wireless protocols such as Bluetooth, Wi-Fi, WLAN, cellular (4G, LTE/A, 5G). The communication interfaces 702 may also include serial interfaces, such as universal serial bus (USB), serial ATA, IEEE 1394, lighting port, I²C, slimBus, or other serial interfaces for communicating on the CAN bus. The communication interfaces 702 may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol for communicating on the CAN bus.

The system circuitry 704 may include any combination of hardware, software, firmware, APIs, and/or other circuitry. The system circuitry 704 may be implemented, for example, with one or more systems on a chip (SoC), application specific integrated circuits (ASIC), microprocessors, discrete analog and digital circuits, and other circuitry. The system circuitry 704 may implement any desired functionality of the ECU 700. As just one example, the system circuitry 704 may include one or more processor 712 and memory 720.

The memory 720 stores, for example, control instructions 723 for executing the security measures, as well as an operating system 721. In one implementation, the processor 712 executes the control instructions 723 and the operating system 721 to carry out any desired functionality of the ECU 700, including those attributed to the secret ID mapping scheme 724 and the secret ID mapping schedule 725. The control parameters 722 provide and specify configuration and operating options for the control instructions 723, operating system 721, and other functionality of the ECU 700.

The ECU 700 may further include a plurality of databases 710 for storing the different secret ID mapping tables. Although sixteen (16) databases were described as being included in the ECUs 131-133, any other number of two or more databases storing their respective unique secret ID mapping table may be used. The ECU 700 also includes sensors 708. The sensors may include one or more sensors for detecting air flow, pressure, temperature, speed, engine characteristics, impact, acceleration pedal position, airbag status, oxygen levels, or other characteristics that may be measurable on a vehicle.

Various implementations have been specifically described. However, other implementations that include a fewer, or greater, number of features and/or components for each of the apparatuses, methods, or other forms described herein are also possible.

What is claimed is:

1. A computing device comprising:
   a data reception circuitry configured to receive a digital message communicated via a controller area network (CAN) bus;
   a data storage unit configured to store a plurality of databases, wherein each of the plurality of databases stores a respective data table including a mapping of an original message identifier (ID) to a secret message identifier (ID);
   a processing circuitry configured to:
      read the digital message to detect a message ID, wherein the message ID is included in an identifier field of a remote frame of the digital message;
      read the digital message to detect a database ID, wherein the database ID is included in a data length code (DLC) field of the remote frame of the digital message;
      retrieve a secret message ID mapping table stored on a database corresponding to the database ID; and
      transmit a return message on the CAN bus, wherein the return message replaces the message ID with the secret message ID.

2. The computing device of claim 1, wherein the database ID is a four-bit binary number.

3. The computing device of claim 1, wherein the plurality of databases comprises sixteen databases.

4. The computing device of claim 1, wherein the digital message is a remote data frame.

5. The computing device of claim 4, wherein the data reception circuitry is configured to receive the remote data frame periodically.

6. A method comprising:
   receiving, by a data reception circuitry, a digital message communicated via a controller area network (CAN) bus;
   storing, in a data storage unit, a plurality of databases, wherein each of the plurality of databases stores a respective data table including a mapping of an original message identifier (ID) to a secret message identifier (ID);
   reading, by a processing circuitry, the digital message to detect a message ID, wherein the message ID is included in an identifier field of a remote frame of the digital message;

reading, by the processing circuitry, the digital message to detect a database ID, wherein the database ID is included in a data length code (DLC) field of the remote frame of the digital message;

retrieving, by the processing circuitry, a secret message ID mapping table stored on a database corresponding to the database ID; and transmitting, by the processing circuitry, a return message on the CAN bus, wherein the return message replaces the message ID with the secret message ID.

7. The method of claim 6, wherein the database ID is a four-bit binary number.

8. The method of claim 6, wherein the plurality of databases comprises sixteen databases.

9. The method of claim 6, wherein the digital message is a remote data frame.

10. The method of claim 9, wherein the data reception circuitry is configured to receive the remote data frame periodically.

11. A computing device comprising:
a processing circuitry configured to:
store a message ID in an identifier field of a digital message, wherein the message ID is included in an identifier field of a remote frame of the digital message; and
store a database ID in a data field of the digital message, wherein the database ID identifies a database including a secret ID mapping table stored on the computing device, and wherein the database ID is included in a data length code (DLC) field of the remote frame of the digital message; and
a data transmission circuitry configured to transmit the digital message on a controller area network (CAN) bus.

12. The computing device of claim 11, wherein the message ID corresponds to a vehicle feature included in a set of predetermined vehicle features.

13. The computing device of claim 11, wherein the database ID is a four-bit binary number.

14. The computing device of claim 11, wherein the digital message is a remote data frame.

15. The computing device of claim 11, wherein the processing circuitry is further configured to:
periodically generate a new digital message, the new digital message including:
the message ID in the identifier field of the new digital message; and
a subsequent database ID in a data field of the new digital message, wherein the subsequent database ID identifies a subsequent database including a subsequent secret ID mapping table stored on the computing device; and
wherein the data transmission circuitry is further configured to transmit the new digital message on the CAN bus.

* * * * *